United States Patent [19]

Seki

[11] Patent Number: 5,511,991

[45] Date of Patent: Apr. 30, 1996

[54] CONNECTOR HAVING A SYMMETRICAL RETAINER FOR ALLOWING INSERTION IN AN INVERTED ORIENTATION

[75] Inventor: Yoshinobu Seki, Shizuoka, Japan

[73] Assignee: Yazaki Corporation, Tokyo, Japan

[21] Appl. No.: 278,814

[22] Filed: Jul. 22, 1994

[30] Foreign Application Priority Data

Jul. 22, 1993 [JP] Japan .................................. 5-201313

[51] Int. Cl.⁶ ................................................... H01R 13/40
[52] U.S. Cl. ........................................................... 439/595
[58] Field of Search ................................... 439/595, 871

[56] References Cited

U.S. PATENT DOCUMENTS 5,397,249  3/1995  Endo et al. .............................. 439/595

Primary Examiner—Neil Abrams
Assistant Examiner—Barry Matthew L. Standig
Attorney, Agent, or Firm—Sughrue, Mion, Zinn, Macpeak & Seas

[57] ABSTRACT

A connector housing includes support walls provided on right and left sides of terminal receiving chambers for receiving metal terminals, respectively, these support walls having retainer-retaining projections. A retainer for being inserted into the connector housing is made of an elastic material, and has lock arms formed on a base portion in a cantilever manner. The first and second lock arms Are integrally provided with a slit formed therebetween, and the first and second lock arms are integrally provided with a slit formed therebetween. The first and second lock arms have generally the same length, and are arranged generally symmetrically with respect to a line passing through the base portion. In a completely-retained condition of the retainer, the first and second lock arms limit the movement of elastic retaining pieces engaged respectively with the metal terminals.

9 Claims, 8 Drawing Sheets

CONNECTOR HAVING A SYMMETRICAL RETAINER FOR ALLOWING INSERTION IN AN INVERTED ORIENTATION

BACKGROUND OF THE INVENTION

1. Field of the Invention

This invention relates to a connector used in wiring of an automobile or the like.

2. Related Art

In a conventional connector of this type, when a metal terminal having a wire connected thereto is to be inserted into and retained on a connector housing, the metal terminal is retained by an elastic retaining piece formed on the connector housing, thereby preventing rearward withdrawal of the metal terminal. A retainer attached to the connector housing prevents an accidental movement of the elastic retaining piece, so that the metal terminal can be held stably.

Namely, the retainer engages the elastic retaining piece to limit the movement of this elastic retaining piece. There is also known a connector of the type in which projections formed on a retainer are engaged with retaining projections formed at a retainer fitting portion in such a manner that the retainer is retained provisionally and completely.

For example, a conventional retainer 104 shown in FIG. 11 includes relatively short lock arms 110b each having a completely-retaining projection 111b, and relatively long lock arms 110a each having an extension portion 113 and a provisionally-retaining projection 111a. A prevention piece 112a is provided between the adjacent short and long lock arms.

Another conventional example of a similar construction shown in FIGS. 12 to 14 is disclosed in Japanese Utility Model Unexamined Publication No. 4-24271.

FIG. 12 is a perspective view of a connector retainer 104 used in a conventional relay block housing, FIG. 13 is a cross-sectional view showing a condition in which the retainer 104 is provisionally retained on the housing 101, and FIG. 14 is a cross-sectional view showing a condition in which the retainer 104 is completely retained on the housing 101.

This retainer 104 includes a prevention piece 112a for limiting the movement of an elastic retaining piece 107a, and a relatively short lock arm 110b having a projection 111b, and a relatively long lock arm 110a having an extension portion 113 and a projection 111a, these lock arms serving to retain the retainer on the housing 101 provisionally and completely.

When the retainer 104 is to be provisionally retained, the projection 111b of the lock arm 110b engages an upper surface of a projection 109b on an inner wall 105b whereas the projection 111a of the other lock arm 110a engages a lower surface of a projection 109a on an inner wall 105a, thereby provisionally retaining the retainer 104, as shown in FIG. 13.

When the retainer 104 is to be completely retained, the projection 111b of the lock arm 110b engages a lower surface of the projection 109b of the inner wall 105b, thereby completely retaining the retainer 104, as shown in FIG. 14.

Here, even if the retainer 104, inverted in a right-left direction, can be attached to the housing 101, the projections 109a and 109b, as well as the projections 111a and 111b, are disposed asymmetrically, and therefore the retainer will not function properly.

In each of the above conventional constructions, the conventional retainer has the lock arms of different lengths which are used as the retaining portions for provisional and complete retaining purposes, respectively. Namely, the retainer is engaged by the lock arms separate from the elastic retaining piece for retaining a metal terminal, and the lock arms are asymmetrical right and left.

Because of this right-left asymmetrical arrangement, in a step of attaching the retainer to the connector housing particularly in the former conventional example, the retainer has often been inserted into the housing in a reverse manner, thus inviting a problem that the efficiency of the operation has been low.

Particularly in the latter conventional example, the retainer can not be of a small size because of its complicated construction, and therefore there has been encountered a problem that a mold is costly.

Furthermore, in either of the conventional examples, the prevention piece for limiting the movement of the elastic retaining piece is interposed between the lock arms through narrow slits, and therefore it has been difficult to withdraw an erroneously-attached metal terminal. Namely, for effecting such a terminal withdrawing operation, a terminal withdrawing jig is inserted into the connector housing through the slit from the retainer side after the retainer is brought into the provisionally-retained position, and then the elastic retaining piece is elastically deformed by it. However, when the jig is inserted, the prevention piece becomes obstructive, so that it has been difficult to elastically deform the elastic retaining piece. If the jig is forcibly inserted, the connector housing or other portion is gouged.

SUMMARY OF THE INVENTION

With the above problems in view, it is an object of this invention to provide a connector having a retainer which will not be erroneously inserted when it is to be attached, and is simple in construction and small in size, and makes it possible to reduce the cost of its mold, and allows a terminal to be easily withdrawn.

The above object of the present invention has been achieved by a connector comprising, in combination, a connector housing in which metal terminals are retained respectively by elastic retaining pieces provided respectively in a plurality of terminal receiving chambers for receiving the inserted metal terminals, respectively, and retaining projections for retaining an inserted retainer provisionally and completely are formed respectively on support walls provided respectively on right and left sides of the adjacent terminal receiving chambers; and the retainer includes lock arms which have respective projections, and are formed on a base portion in a cantilever manner; wherein the retainer has the first and second lock arms of generally the same length which are disposed generally symmetrically, and are integrally connected together, with a slit formed therebetween; and the first and second lock arms, when completely retained on the connector housing, are engaged with the elastic retaining pieces.

The first and second lock arms of the retainer are disposed generally symmetrically, and therefore even if the retainer is turned over right and left, and is attached to the connector housing, the normal function can be achieved without any problem. Moreover, when the first and second lock arms are to be completely retained, they are elastically deformed in a manner to narrow the slit, and the first and second lock arms are engaged with the elastic retaining pieces to limit the movement of these retaining pieces. Therefore, the prevention piece as used in the conventional construction can be omitted, so that a small-size design can be achieved. Because of omission of such a prevention piece, a terminal withdrawing jig, inserted into the connector housing through the slit, can be easily operated to elastically deform the elastic retaining piece, thereby facilitating the withdrawal of the terminal.

DETAILED DESCRIPTION OF THE PREFERRED EMBODIMENTS

A preferred embodiment of the present invention will now be described with reference to the drawings.

In this embodiment, a connector of the present invention is applied to a fuse box in which one fuse circuit is formed by a pair of metal terminals.

Reference is first made to the construction of an embodiment of the present invention. For illustration purposes, an X-axis represents a right-left direction, a Y-axis represents forward-backward direction, and a Z-axis represents an upward-downward direction.

Figure 1:
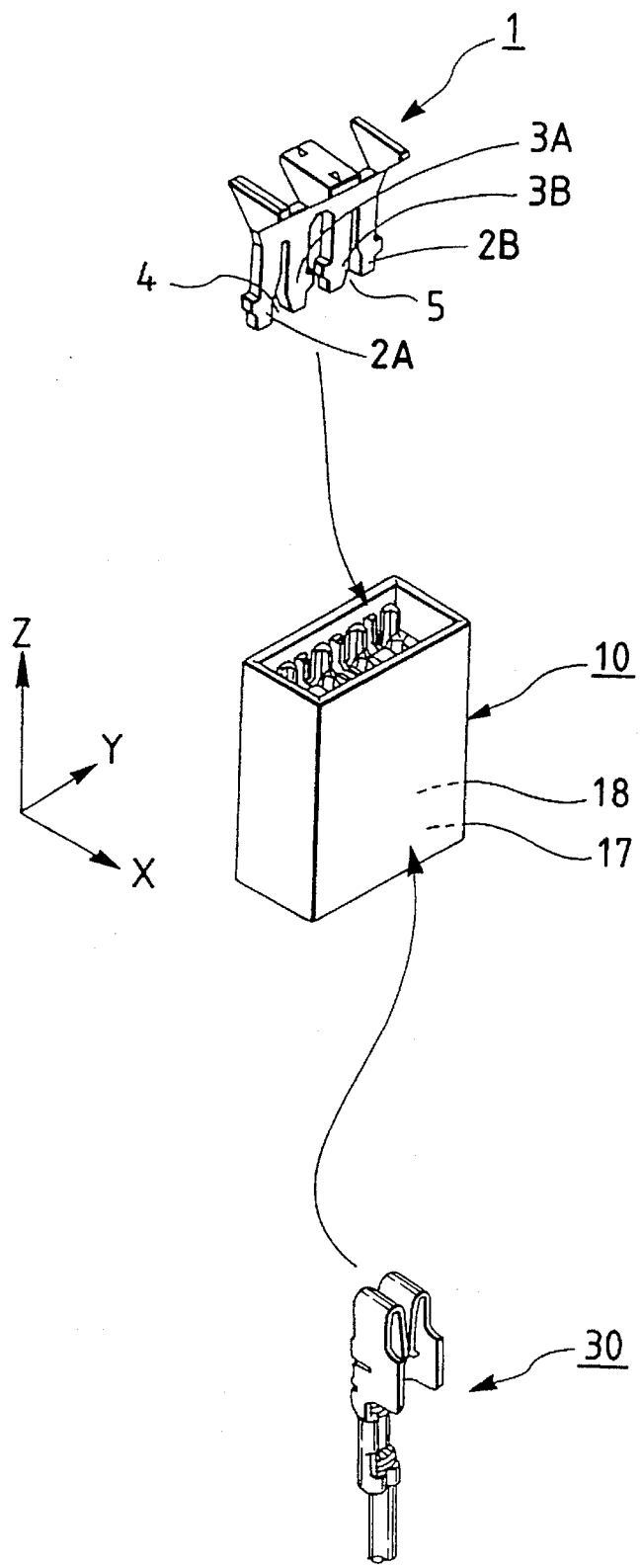
FIG. 1 is a perspective view of one preferred embodiment of a retainer of the invention for a connector.
Figure 2A:
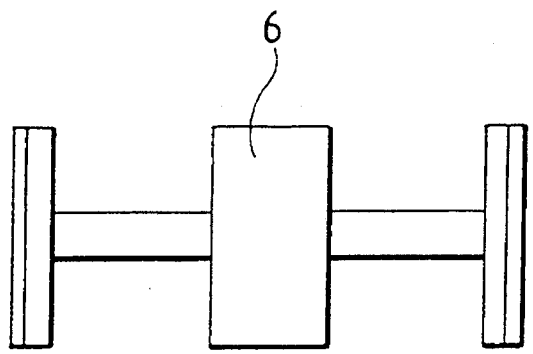
FIG. 2(a) is a top plan view of the retainer of FIG. 1.
Figure 2B:
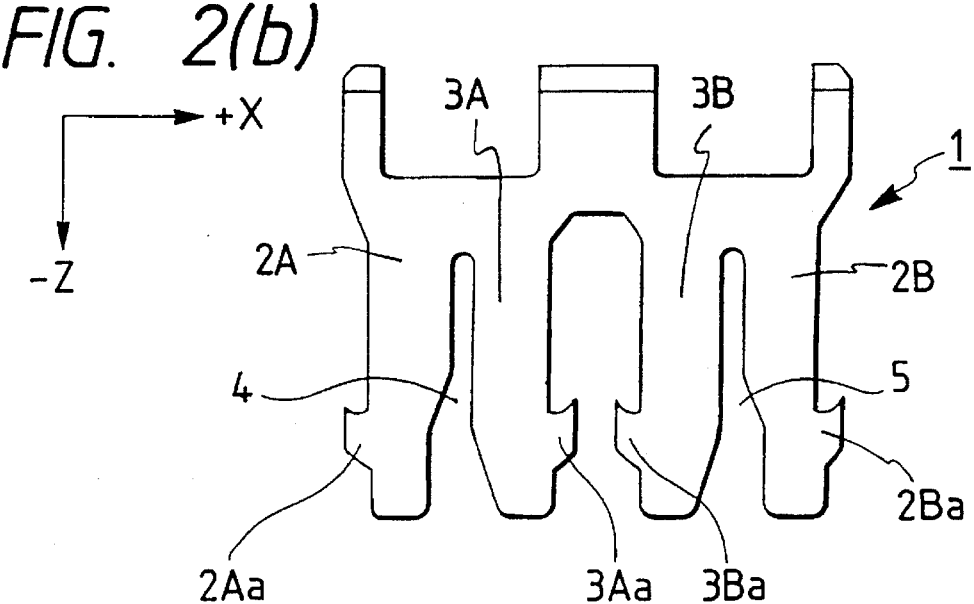
FIG. 2(b) is a front-elevational view thereof.
Figure 2C:
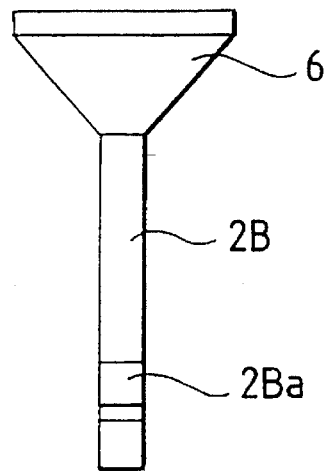
FIG. 2(c) is a side-elevational view thereof.

A retainer 1 is made of an elastic synthetic resin, and as shown in FIG. 2, two pairs of first and second lock arms 2A, 2B, 3A and 3B are formed on right and left ends of a base portion 6 in a cantilever manner, and oppositely-directed firs and second projection 2Aa(2Ba) and 3Aa(3Ba) are formed on each pair of first and second lock arms, respectively. A slit 4 is formed between the first lock arm 2A and the second lock arm 3A, and a slit 5 is formed between the first lock arm 2B and the second lock arm 3B. These slits 4 and 5 themselves do not always need to be symmetrical right and left in configuration, but the two pairs of first and second lock arms (between each of which pairs the slit 4, 5 is formed) are disposed generally or accurately symmetrical right and left.

Particularly in this embodiment, in order that the amount of alternate elastic deformation of the first and second lock arms toward the slit when the retainer 1 shifts from its provisionally-retained to completely-retained position and vice verse as later described in detail can be made as large as possible even if the width of the slit 4, 5 is small as a result of a small-size design of the retainer 1, an open end portion of the slit is enlarged.

A connector housing 10 comprises a box-like body made of an electrically-insulative synthetic resin, and has a pair of terminal receiving chambers 17 and 18 each for receiving a metal terminal 30 inserted thereinto from the lower side.

The metal terminal 30 is received in the pair of front and rear terminal receiving chambers 17 and 18, thereby forming one circuit. In actual use, a plurality of pairs of front and rear terminal receiving chambers 17 and 18 are usually provided in a row in the right-left direction.

Figure 8:
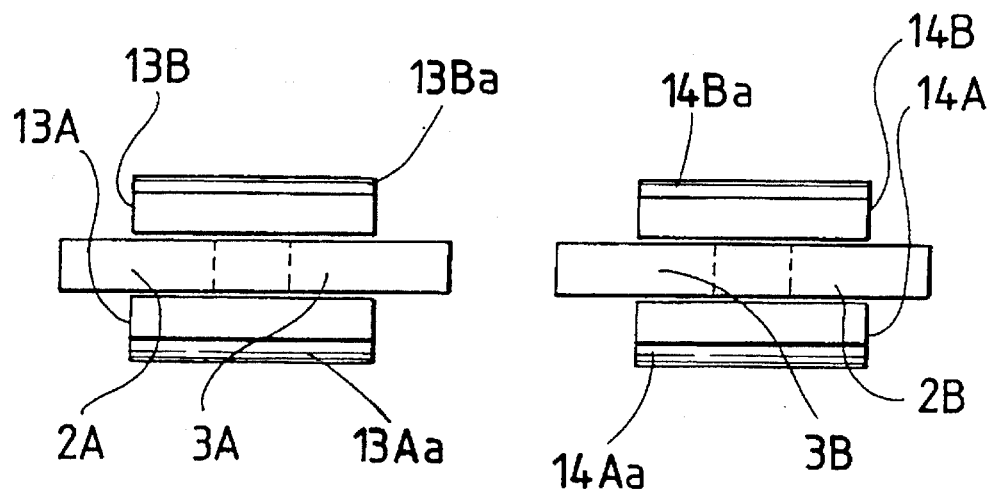
FIG. 8 is a view explanatory of a condition in which lock arms of the retainer of the invention are received in a gap between a pair of elastic retaining pieces.
Figure 9:
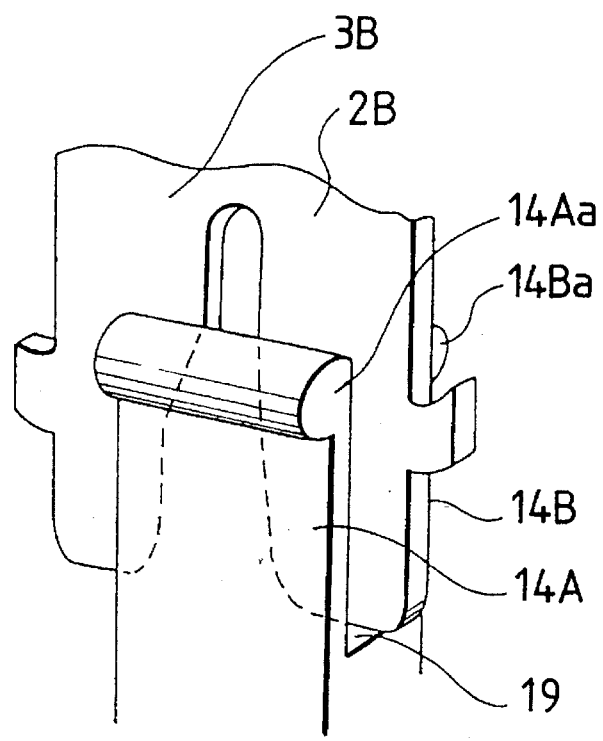
FIG. 9 is a perspective view of an important portion showing the condition in which the lock arms of the retainer of the invention are received in the gap between the pair of elastic retaining pieces.

A pair of elastic retaining pieces 14A and 14B are provided between the pair of front and rear terminal receiving chambers 17 and 18, and are spaced from each other by a gap 19. These retaining pieces 14A and 14B have metal terminal retaining projections 14Aa and 14Ba (see FIG. 7), respectively, and the pair of metal terminals 30 and 30 are retained by these metal terminal retaining projections 14Aa and 14Ba, respectively (FIGS. 8 and 9).

First projections 11Aa and 11Ba for provisionally retaining the inserted retainer 1 are formed respectively on first support walls 11A and 11B, and second projections 12a and 12b for completely retaining the inserted retainer 1 are formed on a second support wall 12. These support walls 11A, 11B and 12 are arranged in a direction (right-left direction) perpendicular to the direction (forward-backward direction) of arrangement of the terminal receiving chambers 17 and 18.

Next, the operation of the retainer will now be described.

Figure 4:
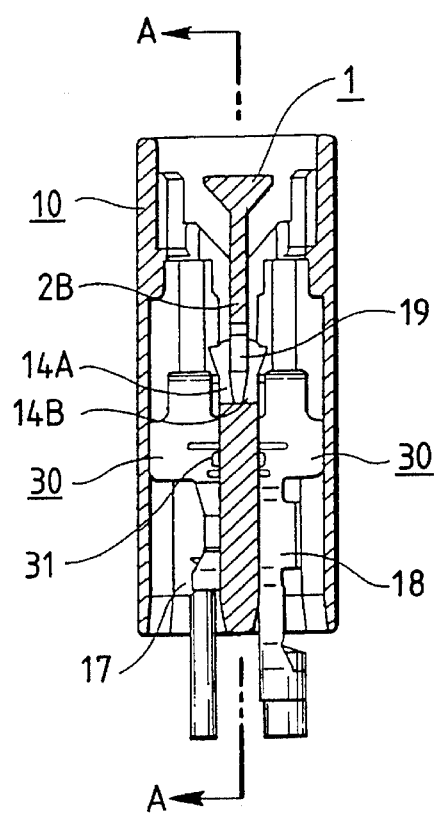
FIG. 4 is a side-elevational, cross-sectional view of the connector housing having the retainer provisionally retained thereon, with metal terminals not yet retained.

In FIG. 4, the retainer 1 is held in a provisionally-retained condition within the connector housing 10.

The pair of metal terminals 30 and 30 are being inserted upwardly respectively into the terminal receiving chambers 17 and 18 from the lower side.

Figure 3A:
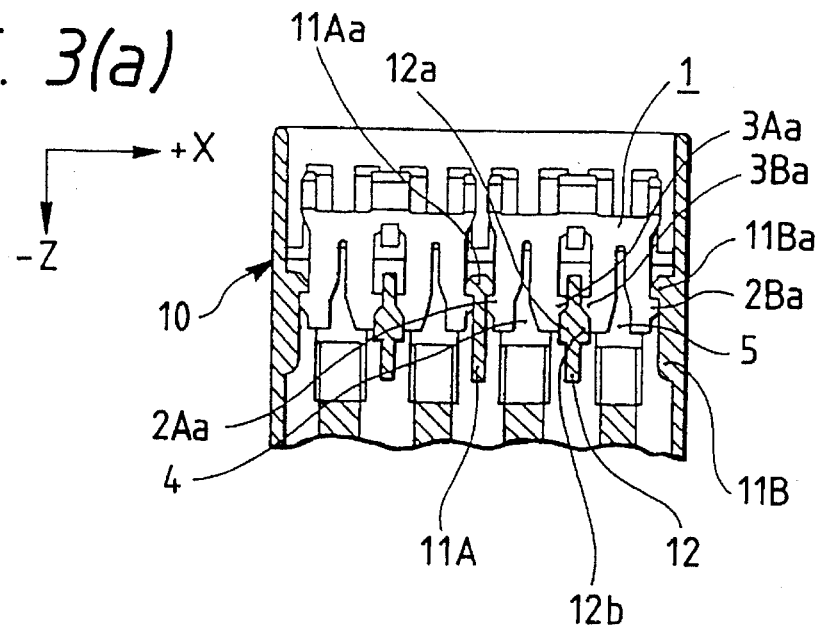
FIG. 3(a) is a front-elevational, cross-sectional view of a connector housing having the retainer of FIGS. 2 (a) to (c) provisionally retained thereon.

As shown in FIG. 3(a), in the provisionally-retained position of the retainer 1, the first projections 2Aa and 2Ba of the first lock arms 2A and 2B are engaged respectively with the lower side of the first projection 11Aa of the first support wall 11A and the lower side of the first projection 11Ba of the first support wall 11B, whereas the second projections 3Aa and 3Ba of the second lock arms 3A and 3B are engaged respectively with the upper sides of the second projections 12a and 12b of the second support wall 12.

As is clear from this Figure, the support walls as well as the projections thereof are symmetrical right and left, and therefore even if the retainer 1 is turned over with respect to its front and back sides, and is inserted in this condition, any disadvantage will not occur, and the same effect as described above can be achieved.

Figure 5:
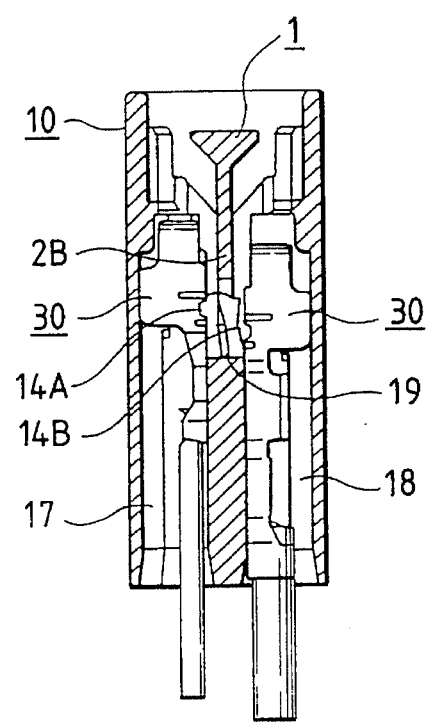
FIG. 5 is a side-elevational, cross-sectional view of the connector housing having the retainer provisionally retained thereon, showing the process of retaining the metal terminals.

Then, as shown in FIG. 5, the metal terminals 30 and 30 are inserted deep respectively into the terminal receiving chambers 17 and 18, and are retained there, with the retainer 1 kept in the provisionally-retained position. In this Figure, the retaining of the metal terminal 30 in the terminal receiving chamber 17 is completed, and the elastic retaining piece 14A is engaged in a retaining hole 31 (see FIG. 4) to retain this metal terminal.

The metal terminal 30 in the terminal receiving chamber 18 is in the process of the retaining operation, and a front end portion of this metal terminal 30 is moving upward while forcing the elastic retaining piece 14B toward the gap 19.

Figure 3B:
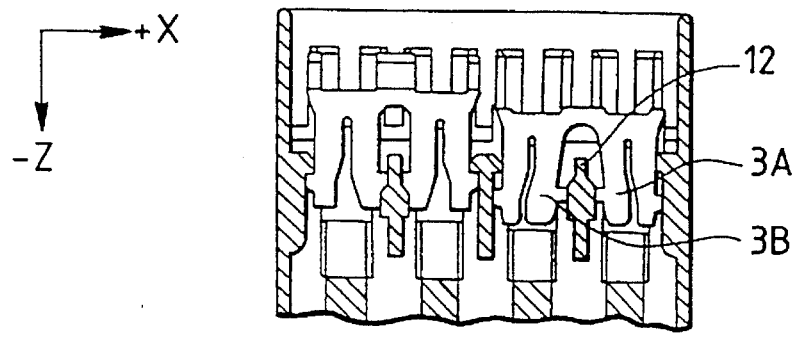
FIG. 3(b) is a similar view showing a condition in which the retainer shifts into a completely-retained position.

FIG. 3(b) shows a condition in which the retainer 1 is shifted from the provisionally-retained condition to the completely-retained condition after the metal terminals 30 and 30 are inserted deep into the terminal receiving chambers 17 and 18, respectively. The retainer 1 is gradually pressed down, and the second projections 3Aa and 3Ba of the second lock arms 3A and 3B slide over the second projections 12a and 12b of the second support wall 12, respectively, so that the retainer 1 is deformed. This deformation proceeds in such a manner as to narrow the slits 4 and 5, and therefore there is obtained a feature that the elastic deformation of a greater degree can be obtained than before.

As is clear from the drawings, the support walls as well as the projections thereof are symmetrical right and left, and therefore even if the retainer 1 is turned over with respect to its front and back sides, and is inserted in this condition, any disadvantage will not occur, and the same effect as described above can be achieved.

Figure 3C:
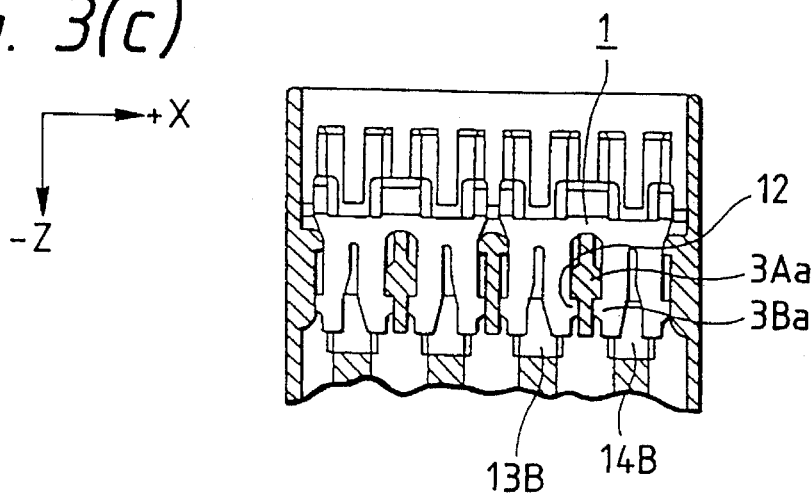
FIG. 3(c) is a similar view showing the completely-retained condition.
Figure 7:
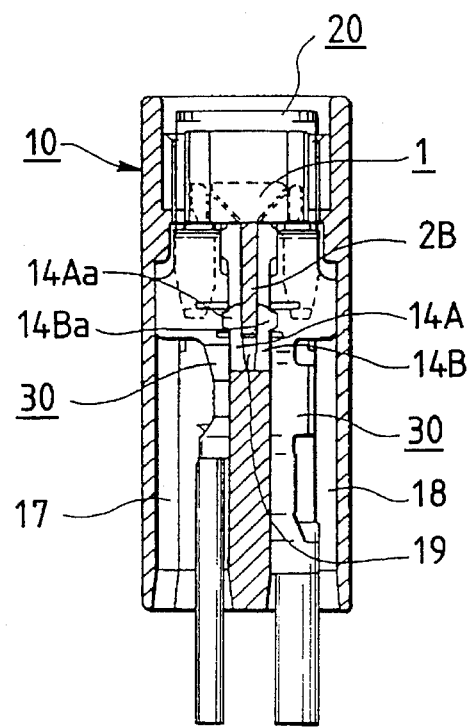
FIG. 7 is a side-elevational, cross-sectional view of the connector housing having the fuse elements attached thereto in the completely-retained condition of the retainer of the invention.

When this shifting operation is finished, so that the second projections 3Aa and 3Ba of the second lock arms 3A and 3B pass over the second projections 12a and 12b of the second support wall 13, respectively, the retainer is completely retained as shown in FIG. 3(c) and 7.

As is clear from the drawings, the support walls as well as the projections thereof are symmetrical right and left, and therefore even if the retainer 1 is turned over with respect to its front and back sides, and is inserted in this condition, any disadvantage will not occur, and the same effect as described above can be achieved.

In the completely-retained condition, the second lock arms 3A and 3B of the retainer 1 are elastically restored, and the first and second lock arms 2A and 3A are received in the gap 19 between the elastic retaining pieces 13A and 13B, and the first and second lock arms 2B and 3B are received in the gap 19 between the elastic retaining pieces 14A and 14B, as shown in FIGS. 8 and 9. As a result, for example, the elastic retaining pieces 14A and 14B are prevented by the lock arms 2B and 3B from being elastically deformed toward the gap 19, thereby stably retaining the metal terminals 30.

Namely, in the completely-retained condition, for example, the lock arms 2B and 3B serve as a stopper means for preventing the movement of the elastic retaining pieces 14A and 14B.

Figure 6:
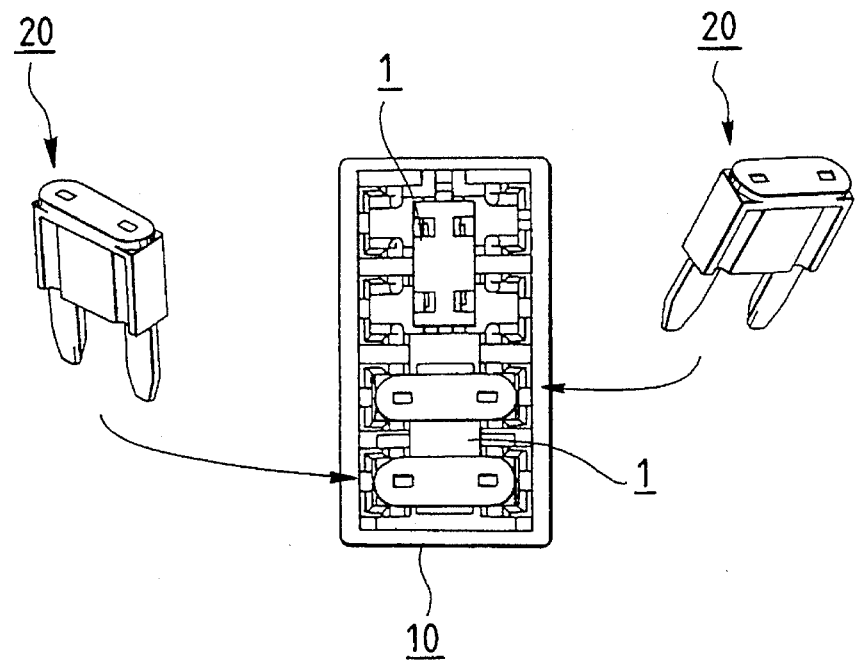
FIG. 6 is a top plan view showing the manner of attaching fuse elements to the connector housing.

In this condition, a fuse element 20 is attached to the connector housing 10, and terminals of this fuse element engage the metal terminals 30 and 30, respectively, thus making an electrical connection, as shown in FIG. 6.

In the construction shown in FIG. 3, the first projections of the first lock arms are retainingly engaged with the first projections of the first support walls, respectively, while the second projections of the second lock arms are retainingly engaged with the second projections of the second support wall, respectively.

Figure 10A:
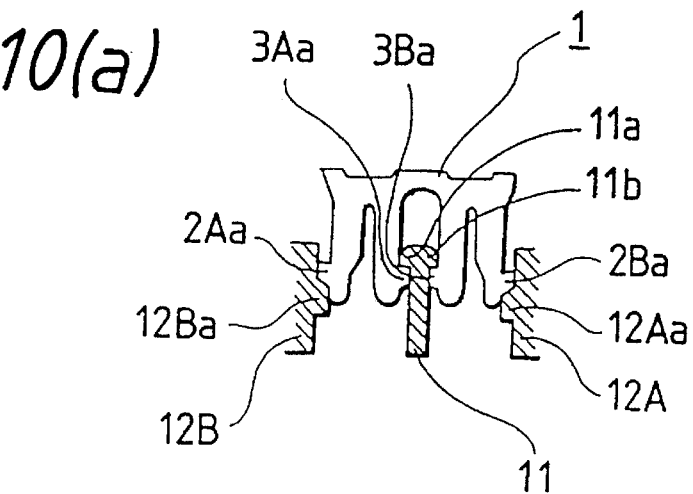
FIGS. 10(a) and (b) front-elevational views showing a condition in which a retainer of the invention is attached to a housing having support walls of a different design.
Figure 10B:
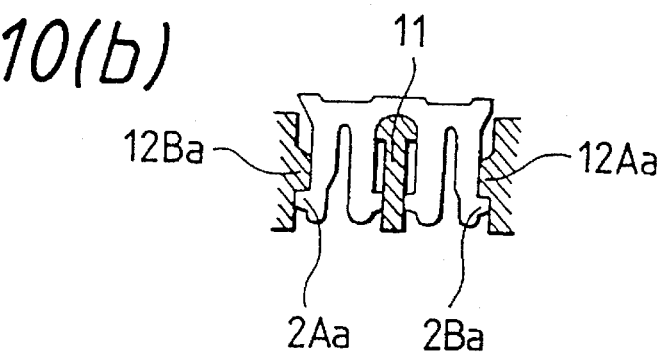
Figure 11:
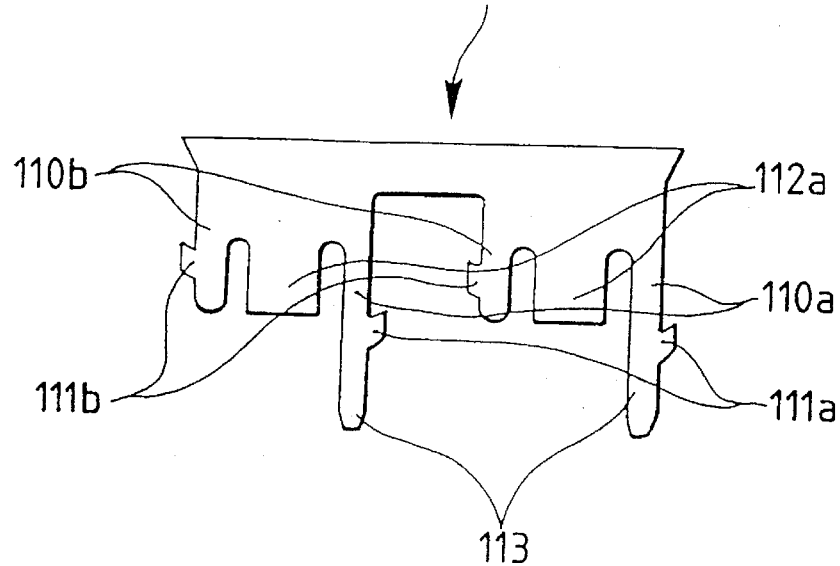
FIG. 11 is a front-elevational view of a conventional asymmetrical retainer.
Figure 12:
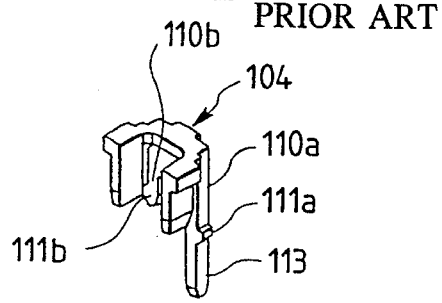
FIG. 12 is a perspective view showing a conventional asymmetrical retainer and a housing.
Figure 13:
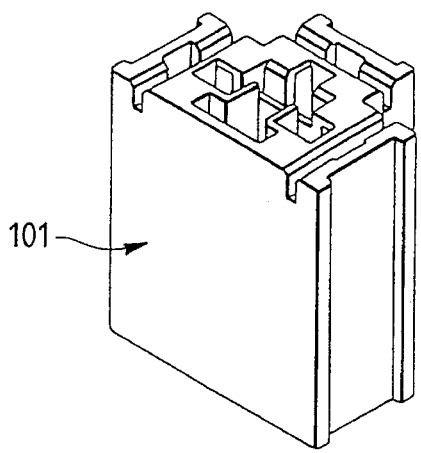
FIG. 13 is a cross-sectional view showing the conventional asymmetrical retainer in its provisionally-retained condition.
Figure 13:
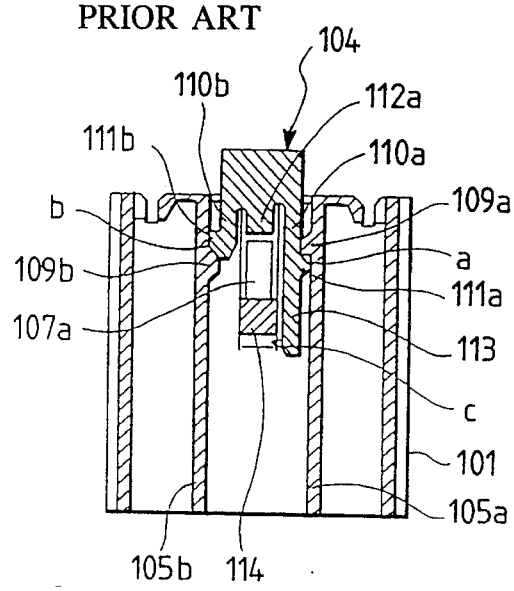
Figure 14:
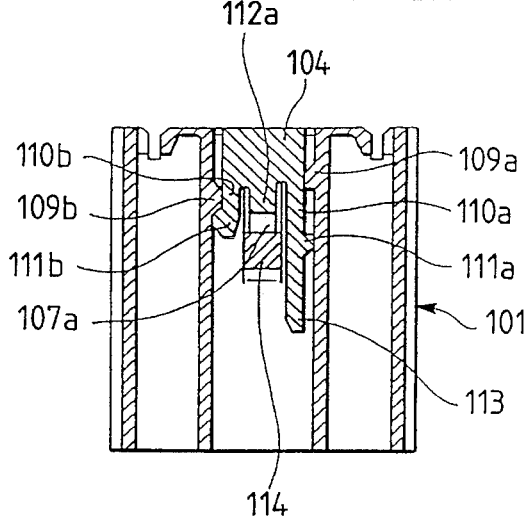
FIG. 14 is a cross-sectional view showing the conventional asymmetrical retainer in its completely-retained condition.

The positions of such first and second support walls can be reversed as shown in FIG. 10, in which case the first projections 2Aa and 2Ba are retainingly engaged with second projections 12Ba and 12Aa, respectively, whereas the second projections 3Aa and 3Ba are retainingly engaged with first projections 11a and 11b, respectively.

As described above, in the connector of the present invention, even if the retainer 1 is attached to the connector housing 10 in either of the opposite directions, the intended function of the retainer can be obtained. Therefore, any particular care is not needed in the assembling process, and an erroneous assembling due to a reverse attachment of the retainer as previously experienced can be completely eliminated.

Moreover, there is no need to provide an erroneous connection prevention means on the connector housing or the retainer, and the cost can be reduced also from this aspect.

With the construction of the retainer of the present invention, the first lock arms 2A and the second lock arms 3A are not long, and when the retainer 1 is to be withdrawn from the completely-retained position to the provisionally-retained position, or when the metal terminal 30 is to be withdrawn from the connector housing 10, a terminal withdrawing jig can be inserted through the slit 4, 5, and can be operated easily. Therefore, there is obtained an advantage that the elastic retaining piece can be elastically deformed to be disengaged from the terminal, so that the withdrawal of the terminal can be carried out quite easily.

Each pair of first and second lock arms can perform the function of the conventional prevention piece, and therefore the connector can be simplified in construction and be of a small size, and the cost of the material as well as the cost of a mold can be reduced. This makes it possible to provide the connector at low costs.

Particularly, the conventional prevention piece is isolated by the right and left slits, and therefore for example, when the metal terminal is forcibly inserted, with the surface of the plate of the prevention piece held against the elastic retaining piece to prevent the movement of the prevention piece, so that this elastic retaining piece is deform, the prevention piece can often elastically deformed or warp, following the deformation of the elastic retaining piece.

In contrast with this, in the retainer for the connector of the present invention, the lock arms, performing the function of the conventional prevention piece, are engaged at their projections with the support walls, and hence are prevented from being warped, and therefore the situation as encountered with the above conventional construction will not occur, and the movement of the elastic retaining piece can be suppressed more positively.

In the above embodiment, although the present invention is applied to the fuse box, the invention can be applied to the type of connector for connecting ordinary wires, in which a plurality of terminal receiving chambers are arranged in a row in a right-left direction as in a half of the above fuse box obtained by dividing it in the forward-backward direction. However, with respect to the type in which a retainer is separate from a connector housing, a fuse box as described in the above embodiment is usually used.

In the above embodiment, although the retainer is of the double interconnecting type having two pairs of lock arms, the invention is not limited to this construction, and can be applied to a single interconnecting type or an interconnecting type as having more than two pairs of lock arms.

As described above, in the retainer for the connector of the present invention, the first lock arms and the second lock arms have generally the same length, and the retainer is generally symmetrical with respect to a line passing through the base portion thereof. Therefore, the direction of attachment of the retainer is not limited, and an assembling mistake is eliminated, and besides any special assembling control is not needed, and further there is no need to provide any erroneous connection prevention means on the connector housing or the retainer. Therefore, the cost can be reduced.

Moreover, since each pair of first and second lock arms performs the function of the conventional prevention piece, the use of the conventional prevention piece is omitted, so that the connector can be simplified in construction and be of a small size, and the cost of material as well as the cost of the mold can be reduced. This makes it possible to provide the connector at low costs.

Furthermore, since the terminal withdrawing jig can be inserted through the slit, the terminal can be withdrawn quite easily, thus markedly enhancing the efficiency of the operation.

What is claimed is:

1. A connector, comprising:

a connector housing having a plurality of terminal receiving chambers and a plurality of elastic retaining lances respectively protruding into said chambers, adjacent pairs of said terminal receiving chambers being defined by a pair of first support walls and a second support wall interposed therebetween, said pair of first support walls each including first locking projections and said second support wall having second locking projections; and a retainer including a pair of first and second lock arms extending forwardly from a base portion thereof, each said first lock arm having a first retaining projection and each said second lock arm having a second retaining projection, wherein said retainer is moveable from a provisional position at which terminals are insertable into said terminal receiving chambers and respectively engaged by said retaining lances to a complete position at which said elastic retaining lances are prevented from being disengaged from said terminals by said retainer, wherein in one of said provisional and complete positions each said first retaining projection engages an associated one of said first locking projections and in another of said provisional and complete positions each said second retaining projection engages an associated one of said second locking projections and wherein said retainer is substantially symmetrical about a center line dividing said pairs of first and second lock arms so that said retainer can be inserted in an inverted orientation.

2. The connector of claim 1, wherein in said complete position one of said first and second lock arms prevents said retaining lances from disengaging said terminals.

3. The connector of claim 1, wherein in said complete position each of said first and second lock arms prevents said retaining lances from disengaging said terminals.

4. A connector as claimed in claim 1, wherein said first and second lock arms are substantially the same length.

5. A connector as claimed in claim 1, wherein a slit is defined between each of said the first and the second lock arms.

6. A connector as claimed in claim 1, wherein said first lock arm and said second lock arm are substantially symmetrical to each other.

7. A connector, comprising:

a connector housing having a terminal receiving chambers and an elastic retaining lance protruding into said chamber, said terminal receiving chamber being defined by first and second support walls, said first support wall including a first locking projection and said second support wall including a second locking projection; and a retainer including first and second lock arms extending forwardly from a base portion thereof, said first lock arm having a first retaining projection and said second lock arm having a second retaining projection, wherein said retainer is moveable from a provisional position at which a terminal is insertable into said terminal receiving chamber and engageable by said retaining lance to a complete position at which said retaining lance is prevented from being disengaged from said terminal by said retainer, wherein in said provisional position said first retaining projection engages said first locking projection and in said complete position said second retaining projection engages said second locking projection and wherein said retainer is substantially symmetrical about a center line dividing said first and second lock arms so that said retainer can be inserted in an inverted orientation.

8. The connector of claim 7, wherein in said complete position one of said first and second lock arms prevents said retaining lance from disengaging said terminal.

9. The connector of claim 7, wherein in said complete position both of said first and second lock arms prevents said retaining lance from disengaging said terminal.

* * * * *